United States Patent Office 2,883,757
Patented Apr. 28, 1959

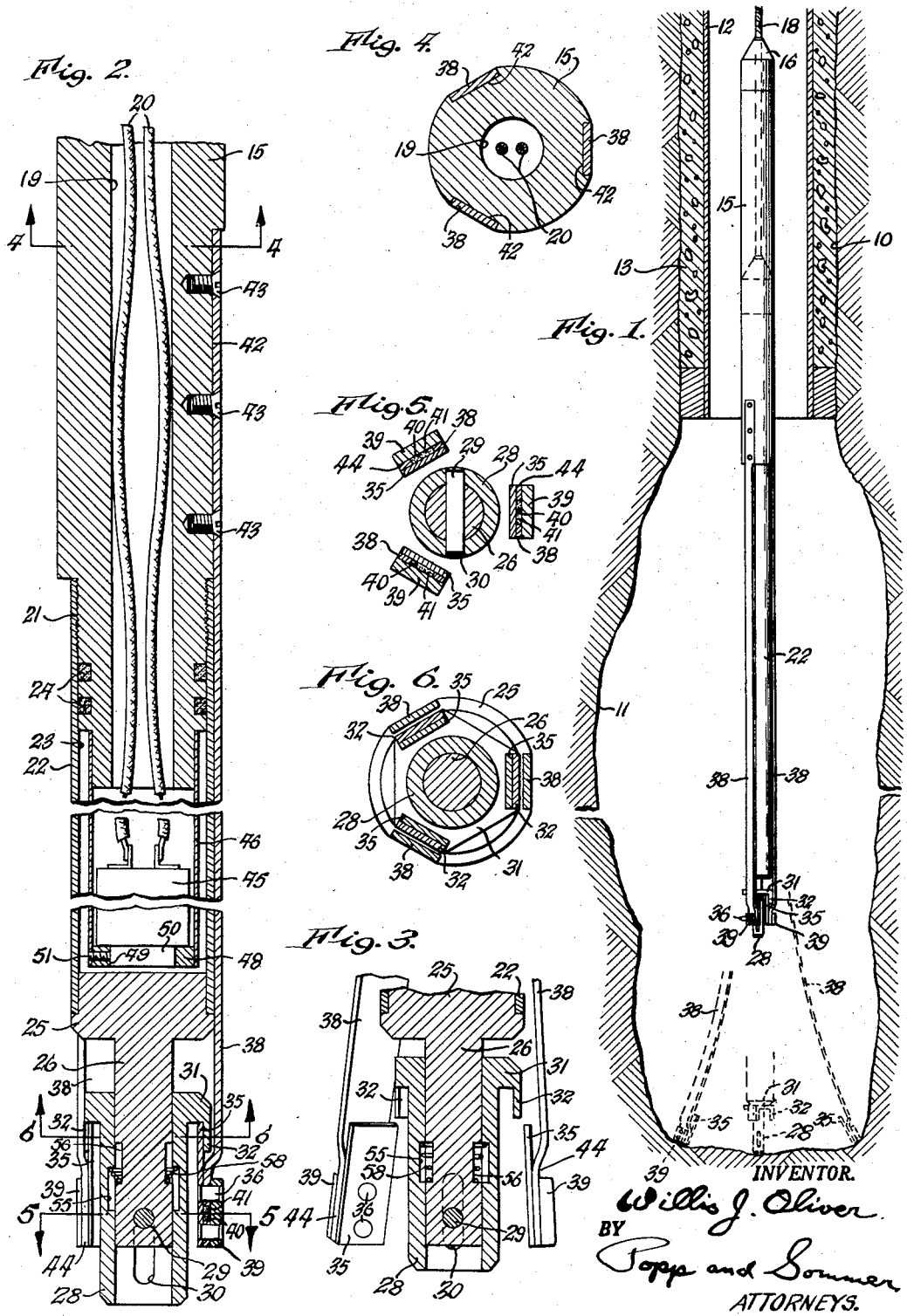

2,883,757

INSTRUMENT FOR MEASURING THE INTERNAL DIAMETER OF WELL BORES OR THE LIKE

Willis J. Oliver, Derrick City, Pa., assignor to James M. Bird, Bradford, Pa.

Application December 27, 1955, Serial No. 555,469

1 Claim. (Cl. 33—178)

This invention relates to an instrument adapted to be suspended from a cable in the bore of a well and which indicates at the surface of the well the internal diameter of the bore at the level of the instrument, this level being readily determined by measurement of the depth the instrument has been lowered into the well.

The internal diameter of the bore of a well may vary due to the formation through which the well is drilled, but more usually due to blasting the bottom of the well which may increase the internal diameter of the bore as much as 20 inches. The bore is also commonly provided with a metal casing leading to the enlarged lower end of the well which can have an internal diameter as small as two inches.

The principal object of the present invention is to provide an instrument for measuring the internal diameter of any part of a well bore which will readily descend through a well casing of such small diameter and which will readily expand to contact and measure a bore of such large diameter.

Another object of the invention is to provide such an instrument by which the measurement readings can be taken at the surface or well head so that as the cable is raised or lowered, the internal diameter of the bore at the progressive stages can be read and recorded.

Another object of the invention is to provide such an instrument by which the internal diameter of the well is transmitted as an electrical signal through the conductor cable so that the reading of the measurements of the device is contemporaneous with the measurements being made.

Another object of the invention is to provide such an instrument which is highly accurate in its reading and in particular is not affected by any irregularities normally encountered in wells.

Another object of the invention is to provide such an instrument in which the reading is from a scale calibrated in substantially equal spaces as compared with a logarithmic scale.

Another object is to provide such an instrument which can be latched in a contracted inoperative position and lowered into the bore and in which the latch is released when the instrument reaches the bottom of the bore so as to render it operative.

Another object is to provide such an instrument which is simple and rugged in construction and not likely to get out of order under conditions of severe and constant use.

Other objects and advantages of the invention will be apparent from the following description and drawings in which:

Fig. 1 is a view showing the instrument suspended in the bore of a well before making contact with the bottom of the lower end of the well, and showing in dotted lines, the instrument after contact has been made.

Fig. 2 is an enlarged fragmentary vertical sectional view of the device shown in Fig. 1.

Fig. 3 is a view similar to Fig. 2, but illustrating the position of the parts after contact has been made with the well bottom.

Figs. 4, 5 and 6 are horizontal sectional views taken on correspondingly numbered lines in Fig. 2.

The instrument forming the subject of the present invention is particularly designed for measuring the internal diameter of the bore 10 of a drilled well, the lower end 11 of which may be enlarged by blasting or other means. Above this lower end 11 of the well, the effective internal diameter of the bore may be further reduced by a well casing 12 which, in accordance with usual practice, is cemented in place by cement 13.

The instrument forming the subject of the present invention comprises a cylindrical metal body 15 removably connected by a suitable coupling 16 to the lower end of a conductor cable 18, from which it is suspended and lowered into the well. For this purpose, the cylindrical body 15 is of substantial weight, the body also having a through bore 19 for electrical conductors 20 through which the signal indicating the internal diameter of the bore at any location of the instrument is transmitted through the conductor cable 18 to the surface of the well head.

The lower end of the cylindrical body 15 is of reduced diameter and externally threaded, as indicated at 21, and on this reduced externally threaded end is screwed the internally threaded upper end of the thin walled metal tube 22. Preferably, the external diameter of the thin walled metal tube 22 is of smaller diameter than the external diameter of the cylindrical body 15 for a purpose which will presently appear. In order to seal the internal cylindrical chamber 23 provided by the thin walled metal tube 22 against leakage of liquids from the bore of the well, the reduced lower end of the cylindrical body 15 can be provided with annular grooves in which sealing rings 24 can be placed.

The lower end of the thin walled metal tube 22 is shown as closed by an end head in the form of a plug 25 inserted into the lower end of the thin walled tube 22 and which can be secured in place in any suitable manner. This plug is shown as having a downwardly projecting coaxial cylindrical stem 26 on which a latch sleeve 28 is slidably mounted. To retain this latch sleeve 28 on the stem 26 and at the same time permit a limited axial movement of the latch sleeve, a cross pin 29 extends through the stem 26 and through axially elongated slots 30 in the opposite sides of the latch sleeve 28. This pin 29 also prevents the latch sleeve 28 from turning and the latch sleeve is shown as having an enlargement 31 at its upper end from which three equally spaced latch fingers 32 project downwardly.

Each of these latch fingers releasably engages a catch in the form of a metal plate 35 which, when latched, extends parallel with the axis of the instrument as shown in Fig. 2. Each metal plate 35 is shown as secured by rivets 36 to the end of a flat spring arm 38. The rivets 36 also extend through a metal block 39 at the end of each arm 38, these metal blocks being adapted to engage the wall of the bore in effecting the measurement as hereinafter described.

An important feature of the invention is that a small hole is provided in the lower end of each spring arm 38 between the plate 35 and block 39 to provide a chamber 40. In each chamber 40 is placed a measured quantity of a radioactive isotope 41 which emits high energy gamma rays. An isotope suitable for this purpose is known as cobalt 60. However, the body 41 of radioactive material can desirably include a proportion of a radioactive isotope emitting low energy gamma rays. The purpose of so including a proportion of material emitting low energy gamma rays is to permit of the use of a linear or evenly spaced scale in reading the output of a radiation detector as hereinafter described.

The upper end of each spring arm 38 is fitted in a longitudinal groove 42 provided externally in the cylindrical body 15 and each spring arm is shown as secured in its groove 42 by a plurality of screws 43. The thickness of the spring arms 38 preferably does not exceed the difference in the external diameters of the cylindrical body 15 and the thin walled tube 22 so that the external diameter of the three spring arms 38, when latched by the latching sleeve 28, does not exceed the external diameter of the cylindrical body 15. To this same end, it will be noted that the lower ends of the spring arms 38 are offset inwardly as indicated at 44, and that the plates 35 and blocks 39 are fixed to these offset ends so that the external diameters of the blocks 39, when the instrument is latched, do not exceed the external diameter of the cylindrical body 15.

The instrument is completed by a tubular Geiger-Müller tube or ionization chamber or other radiation detector 45 arranged coaxially in the chamber 23 formed by the thin walled tube 22 and connected with the conductors 20 so as to transmit through the conductor cable 18 signals corresponding to the strength of gamma ray emanation from the several bodies 41 of radioactive material. The radiation detector 45 is shown as contained within a tubular liner 46 fitted within the thin walled metal tube 22 and having a circular end head 48 at its lower end. This end head is shown as provided with a bore 49 in which a stem 50 at the lower end of the radiation detector is fitted and secured by means of a set screw 51.

It has also been found desirable to counterbalance the weight of the sleeve 28 and to this end the sleeve can be provided with an axially elongated internal groove 55 mating with a similar groove 56 provided on the stem 26. A helical compression spring 58 in these grooves is arranged as shown to bias the sleeve 28 upwardly to the extent of counterbalancing the weight.

The several spring arms are biased to spring away from the thin walled tube 22 and when not in use, the lower ends of these spring arms are brought together and their end plates 35 caught by the latch fingers 32 of the latch sleeve 28 by sliding this latch sleeve 28 longitudinally on the stem 26 to catch these plates 35 when the spring arms 38 are so brought together. In this condition, the instrument is of straight tubular form and can be readily transported and stored.

For use, the instrument is attached to the lower end of the conductor cable 18 and the radiation detector 45 is electrically connected to this conductor cable 18 through the wires 20. The instrument is then lowered, suspended from the conductor cable 18 into the well. When the latching sleeve 28 at the lower end of the instrument reaches the bottom of the well, it is moved upwardly relative to the stem 26 so that its latching fingers 32 disengage the upper ends of the plates 35. Accordingly, the spring arms 38 are released and spring away from the axis of the instrument and engage their blocks 39 with the sides of the bore. The counterbalancing spring 58 holds the sleeve 28 in this elevated position so that the arms can contract back to the initial position shown in Fig. 2 if such contraction is required.

If the lower end of this bore has been enlarged by blasting, as illustrated at 11 in Fig. 1, these blocks 39 engage the side walls of this enlarged lower end 11 of the bore. The radioactive material 41 emanates high and low energy gamma rays and the sum of the gamma rays, from the three spring arms, which strike the radiation detector 45, are detected by the detector and transmitted as a signal through the lines 20 and conductor cable 18 to the head of the well where the strength of the signal is measured.

This strength of the signal is inversely proportional to the square of the distance of the several radioactive bodies 41 from the radiation detector and hence variations in the diameter of the bore as determined by variations in distance of the blocks 39 from the radiation detector 45 can readily be determined at the head of the well by measuring variations in the signal strength. It has further been determined that by including a low energy gamma ray emitting material in the bodies 41 and by arranging the bodies 41 of radioactive material so that in the contracted position shown in Fig. 2 they are spaced a substantial distance substantially directly below the radiation detector 45 and to spring outwardly about arcs centered above the radiation detector, the signal strength varies inversely with the distance of the sources 41 of radioactive material and not with the square of this distance so that the strength of the signal at the head of the well can be measured on a scale calibrated in units of equal spacing in contrast to a logarithmic scale. As the cable is raised, the blocks 39 are dragged along the inside face of the enlargement 11 of the bore and move toward or away from the radiation detector 45, thereby to indicate, at the head of the well, the changing internal diameter of the bore of the well. In this connection the emanation of gamma rays from the low energy isotope is particularly effective when the bodies 41 are close to the radiation detector 45 and the emanation of gamma rays from the high energy isotope is particularly effective when the bodies 41 are remote from the radiation detector 45 so that by their use in combination the output of the radiation detector 45 is rendered substantially linear in measuring the distance of these bodies 41 from the radiation detector.

As the bore is provided with a casing 12, as shown, when the upper ends of the spring arms 38 contact the lower rim of this casing 12, these spring arms are drawn together so as to readily be drawn up the casing in removing the instrument from the well. In the event that the well is not provided with the casing 12, the blocks 39 at the ends of the swinging arms 38 continue to engage the bore and continue to indicate any changes in internal diameter of the bore at the head of the well.

From the foregoing, it will be seen that the present invention provides a very simple, rugged, accurate and highly sensitive device for measuring the internal diameter of the bore of a well of any depth at any location and achieves the various objectives heretofore set forth.

I claim:

An instrument for measuring the internal diameter of a well bore or the like, comprising a body adapted to be lowered into said well bore, a plurality of spring arms extending longitudinally of said well bore and connected at their upper ends to said body with their lower ends biased radially toward the wall of said well bore, a member carrying a quantity of radioactive material emitting both low and high energy gamma rays at the lower end of each spring arm and moveable with the spring arm toward and from said body, a radiation detector in said body and in the closest positions of said members to said detector being arranged a substantial distance substantially directly above said members and below the centers of the arcs described by said members whereby the strength of the signal generated by said detector varies inversely with the distance of said members from said body rather than with the square of such distance, and means arranged to transmit said signal from said radiation detector to a remote location.

References Cited in the file of this patent

UNITED STATES PATENTS

| | | |
|---|---|---|
| 2,102,080 | Kinley | Dec. 14, 1937 |
| 2,649,786 | Goble | Aug. 25, 1953 |
| 2,725,486 | Walstrom | Nov. 29, 1955 |